United States Patent [19]
Varga

[11] Patent Number: 6,144,194
[45] Date of Patent: *Nov. 7, 2000

[54] POLYPHASE SYNCHRONOUS SWITCHING VOLTAGE REGULATORS

[75] Inventor: Craig Steven Varga, Mountain View, Calif.

[73] Assignee: Linear Technology Corp., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/114,384

[22] Filed: Jul. 13, 1998

[51] Int. Cl.$^7$ .................................................. G05F 1/40
[52] U.S. Cl. ........................... 323/285; 323/269; 323/282
[58] Field of Search .................................... 323/285, 282, 323/281, 280, 269; 363/40, 41, 43, 65, 71; 318/798

[56] References Cited

U.S. PATENT DOCUMENTS

| | | | |
|---|---|---|---|
| 4,137,489 | 1/1979 | Lipo | 318/798 |
| 4,920,309 | 4/1990 | Szepesi | 323/269 |

OTHER PUBLICATIONS

1992 Linear Databook Supplement at pp. 7–13 to 7–22, published by Linear Technology Corporation, Milpitas, California, copyright 1992.

1995 Linear Databook vol. IV at pp. 4–360 to 4–373, published by Linear Technology Corporation, Milpitas, California, copyright 1995.

1996 Linear Databook vol. V at pp. 4–212 to 4–230, published by Linear Technology Corporation, Milpitas, California, copyright 1996.

1996 Linear Databook vol. V at pp. 4–231 to 4–258, published by Linear Technology Corporation, Milpitas, California, copyright 1996.

Ashok Bindra, "Multiphase Controller Meets Pentium's Power Demands," Electronic Design, 46(18):28–34 (Aug.3, 1998).

Semtech Corp., SC1144 Datasheet, Preliminary –Aug. 4, 1998.

Semtech Corp., SC1144EVB User's Manual, Preliminary Sep. 1, 1998.

Semtech Corp., SC1144 Datasheet, Preliminary –Aug. 24, 1999.

*Primary Examiner*—Adolf Deneke Berhane
*Assistant Examiner*—Rajnikant B. Patel
*Attorney, Agent, or Firm*—Fish & Neave

[57] ABSTRACT

The invention provides polyphase synchronous switching regulator circuits that include N power stages connected in parallel, with each stage synchronized to a timing control signal that is 360°/N out of phase from one another. Each power stage supplies current $I_{OUT}/N$ to the load. Current-mode and voltage-mode control implementations are described that provide efficient, low voltage, high current synchronous switching regulator circuits that have low input ripple current, low EMI, high slew-rate capability and low output ripple.

33 Claims, 4 Drawing Sheets

POLYPHASE SYNCHRONOUS SWITCHING VOLTAGE REGULATORS

BACKGROUND OF THE INVENTION

The present invention relates to synchronous switching voltage regulator circuits. More particularly, the present invention relates to polyphase synchronous switching regulator circuits that provide lower peak input current, lower root-mean-square (RMS) input ripple current, lower RMS output ripple current, higher slew-rate capability and less stringent input and output filter requirements compared to comparable single-phase synchronous switching regulator circuits.

Switching regulators provide a predetermined and substantially constant output voltage from a source voltage that may be poorly-specified or fluctuating, or that may be at an inappropriate amplitude for the load. Such regulators typically employ a switch that includes one or more switching elements coupled in series or in parallel with the load. The switching elements may be, for example, power metal-oxide semiconductor field-effect transistor (MOSFET) switches. Control circuitry regulates the current supplied to the load by varying the ON-OFF times of the switching elements (i.e., the regulator's duty cycle, which is the percentage of time that a switch is ON during a cycle of operation). Inductive energy storage elements typically are used to convert the switched current pulses into a steady flow of load current.

Synchronous switching regulators include a main switching element and a synchronous switching element that typically are driven by non-overlapping clock pulses to supply current at a regulated voltage to a load. Synchronous switching regulators that use power MOSFET switches frequently are used in portable battery-powered electronic products and thermally-sensitive products. These regulators convert the typically fluctuating input voltage to a regulated output voltage. Such regulators provide high operating efficiency and thus long battery life with little heat generation.

The duty cycle of a synchronous switching regulator typically is controlled by monitoring the regulator's output voltage. In particular, the control circuitry generates a feedback signal $V_e$ that is proportional to the difference between the regulator's output voltage and a reference voltage. $V_e$ may be used to provide either "voltage-mode" or "current-mode" regulation. In voltage-mode regulation, $V_e$ and a periodic sawtooth waveform $V_s$ are provided as inputs to a comparator, the output of which controls the duty cycle of the power MOSFET switches. For example, if $V_e$ is connected to the comparator's non-inverting input, $V_s$ is connected to the comparator's inverting input, and at the start of each clock cycle $V_s$ is below $V_e$, then the comparator's output is HIGH, the main switch is ON and the synchronous switch is OFF. When $V_s$ exceeds $V_e$, the comparator's output changes state to LOW, which turns OFF the main switch and turns ON the synchronous switch.

In current-mode regulation, a voltage $V_i$ is generated that is proportional to the current in the output inductor, and $V_i$ and $V_e$ are provided as inputs to a comparator, the output of which controls the duty cycle of the power MOSFET switches. For example, if $V_i$ is connected to the comparator's non-inverting input, $V_e$ is connected to the comparator's inverting input, and if at the start of each clock cycle $V_i$ is below $V_e$, then the comparator's output is LOW, the main switch is ON and the synchronous switch is OFF. When $V_i$ exceeds $V_e$, the comparator's output changes state to HIGH, which turns OFF the main switch and turns ON the synchronous switch. In this regard, the main switch turns OFF when the output current reaches its desired value.

Prior art synchronous switching regulators typically include a single power stage controlled by a single-phase clock. Such single-phase synchronous switching regulators are inefficient, however, for applications that require low voltage (e.g., <2 volts) at high current (e.g., greater than 35 amps), such as power supplies for advanced microprocessors. In particular, because the input RMS ripple current in a switching buck regulator is approximately one-half the output current, high output current buck regulators require large input capacitors to provide sufficient input ripple filtering. Typically, this requires connecting many capacitors in parallel, which is costly and consumes valuable circuit board space.

In addition, for many switching regulator topologies, the input current has sharp discontinuities as a result of the switching action of the main switch. Because the regulator's peak input current is approximately equal to the circuit's output current, high current designs require substantial filtering to limit conducted electromagnetic interference (EMI). Further, for applications that require output currents greater than approximately 15 amps, the necessary output filter inductors are too large to be implemented using surface mount technology. Additionally, large output capacitors typically are required to minimize output ripple current.

Moreover, many state-of-the-art microprocessors have dynamic loading characteristics that frequently change from nearly zero load to full load within a very short time span, often tens to hundreds of nanoseconds. Power supplies for such microprocessors must have very high current slew rate capability to meet such dynamic load requirements and minimize the decoupling capacitance required at the load. High slew rate capability requires that the inductor value should be minimized. Because the output ripple current is inversely proportional to inductor value, however, prior art synchronous switching regulator circuits typically achieve high slew rate only at the expense of large output ripple current.

In view of the foregoing, it would be desirable to provide efficient, low voltage, high current, synchronous switching regulator circuits that have low input and output ripple currents.

It would further be desirable to provide low voltage, high current synchronous switching regulator circuits that limit conducted EMI.

It additionally would be desirable to provide low voltage, high current synchronous switching regulator circuits that may be implemented using surface-mount technology.

It also would be desirable to provide low voltage, high current synchronous switching regulator circuits that have high current slew rate capability and low output ripple current.

SUMMARY OF THE INVENTION

Accordingly, it is an object of this invention to provide efficient, low voltage, high current synchronous switching regulator circuits that have low input and output ripple currents.

It still further is an object of this invention to provide low voltage, high current synchronous switching regulator circuits that limit conducted EMI.

It additionally is an object of this invention to provide low voltage, high current synchronous switching regulator circuits that may be implemented with surface-mount technology.

It also is an object of this invention to provide low voltage, high current synchronous switching regulator circuits that have high current slew rate capability and low output ripple current.

In accordance with these and other objects of the present invention, polyphase synchronous switching regulator circuits are described that provide regulated output voltage $V_{OUT}$ to load $R_L$ at output current $I_{OUT}$. Exemplary voltage regulators include N power stages connected in parallel, with each stage synchronized to a timing control signal that is 360°/N out of phase from adjacent stages. Each power stage supplies current $I_{OUT}$/N to the load. Circuits may be implemented using current-mode and voltage-mode control.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE INVENTION

To provide background for the present invention, the following detailed description first describes previously known single-phase synchronous switching regulator circuits. Then, the modification of such previously known regulators to construct polyphase regulators is described and alternative embodiments are disclosed.

A. Prior Art Single-phase Synchronous Switching Regulators

Figure 1A:
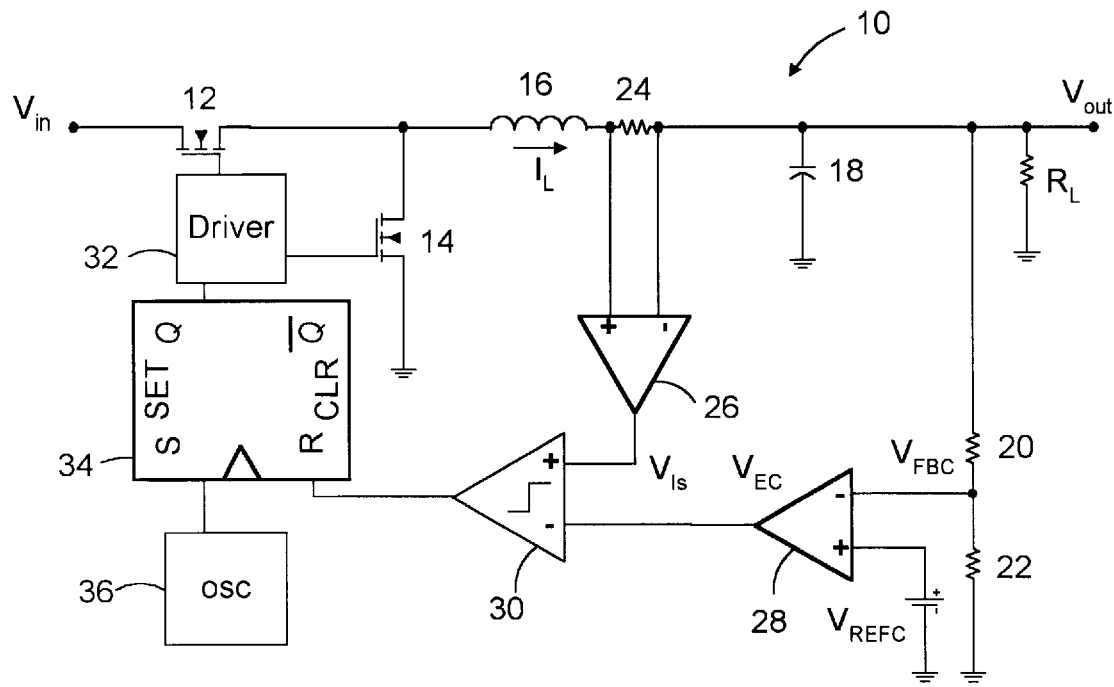
FIG. 1A is a schematic diagram of a conventional single stage current-mode synchronous switching regulator.

FIG. 1A shows a prior art single-phase current-mode synchronous switching regulator 10 in which current sense resistor 24 monitors current $I_L$ in inductor 16. Regulator 10 typically is used for DC-to-DC conversion of an unregulated supply voltage $V_{IN}$ (e.g., a battery) to a regulated output voltage $V_{OUT}$, for driving a load $R_L$, which, although simply shown as a resistor, may be, for example, a portable communication device or a computer. Examples of single-phase current-mode synchronous switching regulators include the LTC1148 and LTC1435, sold by Linear Technology Corporation, of Milpitas, Calif., and the MAX797, sold by Maxim Integrated Products, Inc., of Sunnyvale, Calif.

Regulator 10 typically operates as follows: at the beginning of a cycle, oscillator 36 generates a single-phase clock signal at a desired switching frequency, typically 100–300 kHz, that sets latch 34, causing driver 32 to turn ON main switch 12 and turn OFF synchronous switch 14. This results in a voltage of approximately $V_{IN}$–$V_{OUT}$ across inductor 16, which increases current $I_L$ through inductor 16. Current sense amplifier 26 detects the voltage generated across sense resistor 24, and generates an output $V_{Is}$ that is connected to the non-inverting input of comparator 30. The inverting input of comparator 30 is coupled to the output $V_{EC}$ of error amplifier 28. $V_{EC}$ is proportional to the difference between reference voltage $V_{REFC}$ and feedback voltage $V_{FBC}$, whose value is determined by $V_{OUT}$ and voltage divider resistors 20 and 22. Inductor 16 and capacitor 18 form a low-pass filter to remove undesirable harmonics of the switching frequency from output voltage $V_{OUT}$.

As inductor current $I_L$ increases, $V_{Is}$ increases. When $I_S$ exceeds $V_{EC}$, comparator 30 trips and resets latch 34, which then causes driver 32 to turn OFF main switch 12 and turn ON synchronous switch 14. This changes the voltage across inductor 16 to approximately –$V_{OUT}$, causing inductor current $I_L$, which is conducted by synchronous switch 14, to decrease until the next clock pulse of oscillator 36 sets latch 34.

During normal operation, therefore, main switch 12 is turned OFF when inductor current $I_L$ reaches a predetermined level set by the output $V_{EC}$ of error amplifier 28. If the regulated output voltage $V_{OUT}$ increases above a predetermined steady-state value set by voltage divider resistors 20 and 22 and voltage reference $V_{REFC}$, error voltage $V_{EC}$ decreases. As a result, $V_{Is}$ crosses $V_{EC}$ earlier in the switch cycle than during steady-state operation. The shortened duty cycle causes regulated output voltage $V_{OUT}$ to decrease until it reaches its previous steady-state value. If, however, the regulated output voltage $V_{OUT}$ decreases below the predetermined steady-state value, error voltage $V_{EC}$ increases, and the duty cycle of switch 12 is lengthened because $V_{Is}$ crosses $V_{EC}$ later in the switch cycle than during steady-state operation. The lengthened duty cycle causes regulated output voltage $V_{OUT}$ to increase until it reaches its previous steady-state value.

Figure 1B:
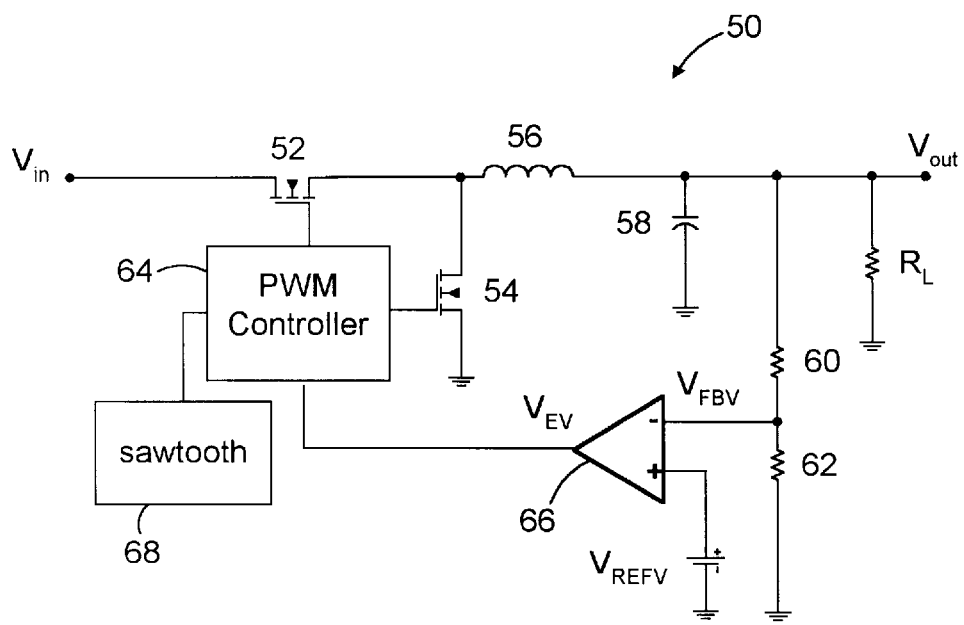
FIG. 1B is a schematic diagram of a conventional single stage voltage-mode synchronous switching regulator.

Alternatively, prior art synchronous switching regulators may be implemented using voltage-mode control, in which the regulator monitors the output voltage to set duty cycle. Examples of voltage-mode switching regulators are the LTC1430, sold by Linear Technology Corporation, and the Si9150, sold by Siliconix Incorporated, of Santa Clara, Calif. FIG. 1B shows such a prior art single-phase voltage-mode synchronous switching regulator 50 that operates as follows: main switch 52 and synchronous switch 54 are coupled to pulse width modulator (PWM) controller 64, which varies the regulator's duty cycle in response to variations in the regulated output voltage $V_{OUT}$. In particular, error amplifier 66 produces output voltage $V_{EV}$ that changes in proportion to any difference in voltage between reference voltage $V_{REFV}$ and feedback voltage $V_{FBV}$. Voltage divider resistors 60 and 62 set the value of $V_{FBV}$ to be proportional to the regulated output voltage $V_{OUT}$.

In particular, at the start of each clock cycle, PWM Controller 64 turns ON main switch 52 and turns OFF synchronous switch 54. PWM Controller 64 turns main switch 52 OFF and synchronous switch 54 ON when the sawtooth signal produced by sawtooth generator 68 exceeds $V_{EV}$. As in the current-mode regulator of FIG. 1A, inductor 56 and capacitor 58 form a low-pass filter to remove undesirable harmonics of the switching frequency from output voltage $V_{OUT}$.

During normal operation, if $V_{OUT}$ decreases below its desired steady-state value set by voltage divider resistors 60 and 62 and voltage reference $V_{REFV}$, $V_{EV}$ increases and therefore the sawtooth signal provided by sawtooth generator 68 crosses $V_{EV}$ later in the clock cycle, causing PWM controller 64 to extend the ON-duration of main switch 52. As a result, the current flowing through main switch 52 and inductor 56 increases, and $V_{OUT}$ increases until it reaches its previous steady-state value. If, however, $V_{OUT}$ increases above its desired steady-state value, $V_{EV}$ decreases and therefore the sawtooth signal provided by sawtooth generator 68 crosses $V_{EV}$ earlier in the clock cycle, causing PWM controller 64 to shorten the ON-duration of main switch 52. As a result, the current flowing through main switch 52 and inductor 56 decreases, and $V_{OUT}$ decreases until it reaches its previous steady-state value.

B. Polyphase Synchronous Regulators

Figure 2:
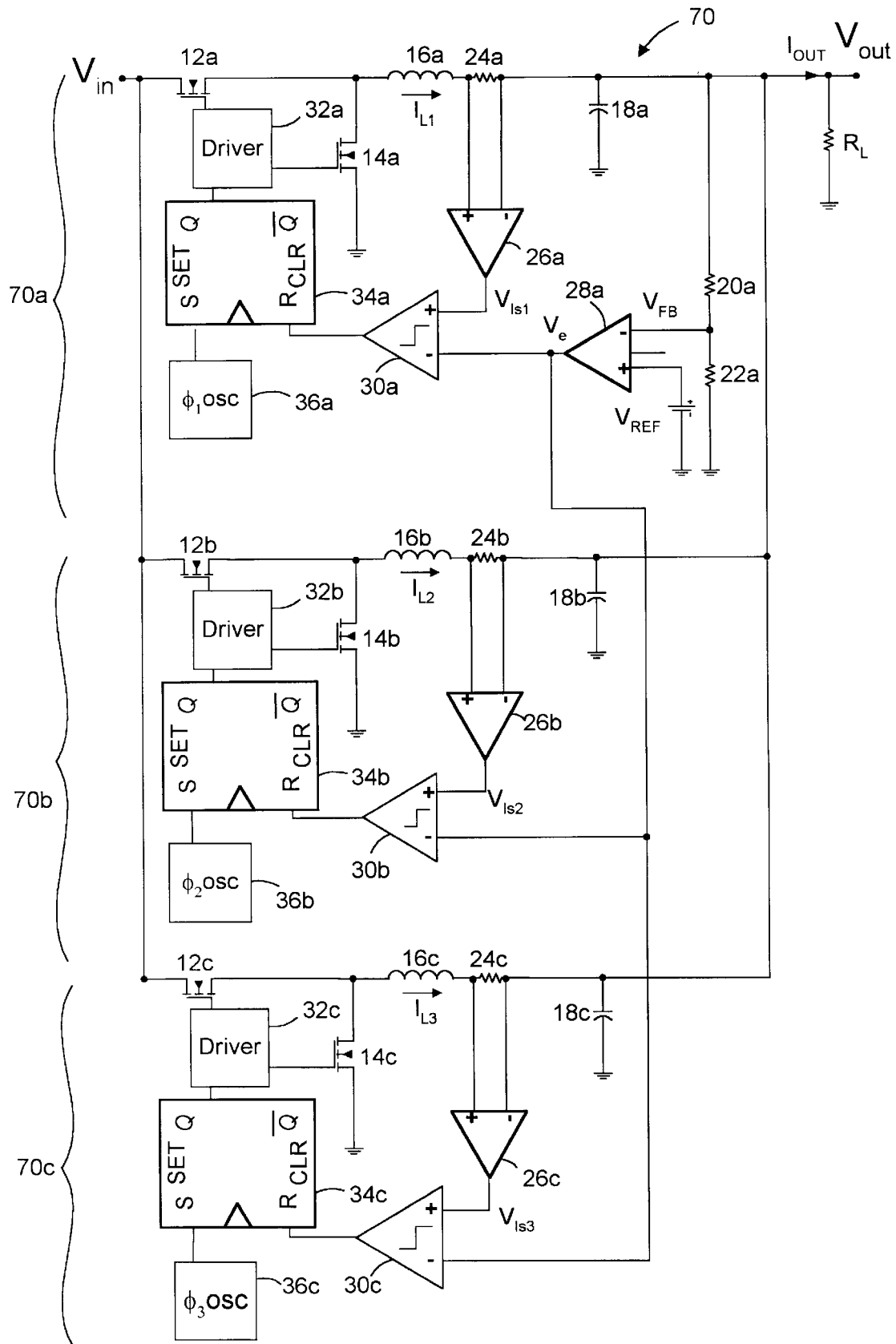
FIG. 2 is a schematic diagram of an exemplary embodiment of a 3-stage current-mode synchronous switching regulator constructed in accordance with the principles of the present invention.

FIG. 2 shows a schematic diagram of one exemplary embodiment of a polyphase synchronous current-mode switching regulator of the present invention. Regulator 70 includes three separate current-mode switching regulator stages, 70a, 70b and 70c, each of which are derived from the single-phase regulator 10 of FIG. 1A. Regulator stages 70a, 70b and 70c are identical, except that stages 70b and 70c share the output voltage feedback loop consisting of divider resistors 20a and 22a, voltage reference $V_{REF}$ and error amplifier 28a.

Regulator stage 70a includes main switch 12a, synchronous switch 14a, inductor 16a, sense resistor 24a, output capacitor 18a, voltage divider resistors 20a and 22a, current sense amplifier 26a, error amplifier 28a, comparator 30a, driver 32a, latch 34a and oscillator 36a that function in the same manner as the corresponding circuit components described above in connection with FIG. 1A.

Regulator stage 70b similarly includes main switch 12b, synchronous switch 14b, inductor 16b, sense resistor 24b, output capacitor 18b, current sense amplifier 26b, comparator 30b, driver 32b, latch 34b and oscillator 36b. The inverting input of comparator 30b is coupled to output $V_e$ of error amplifier 28a, completing the feedback loop for regulator stage 70b, which also functions as described above in connection with FIG. 1A.

Likewise, regulator stage 70c includes main switch 12c, synchronous switch 14c, inductor 16c, sense resistor 24c, output capacitor 18c, current sense amplifier 26c, comparator 30c, driver 32c, latch 34c and oscillator 36c. The inverting input of comparator 30c is also coupled to output $V_e$ of error amplifier 28a, providing output feedback for regulator stage 70c, which also functions as described above in connection with FIG. 1A.

Figure 4A:
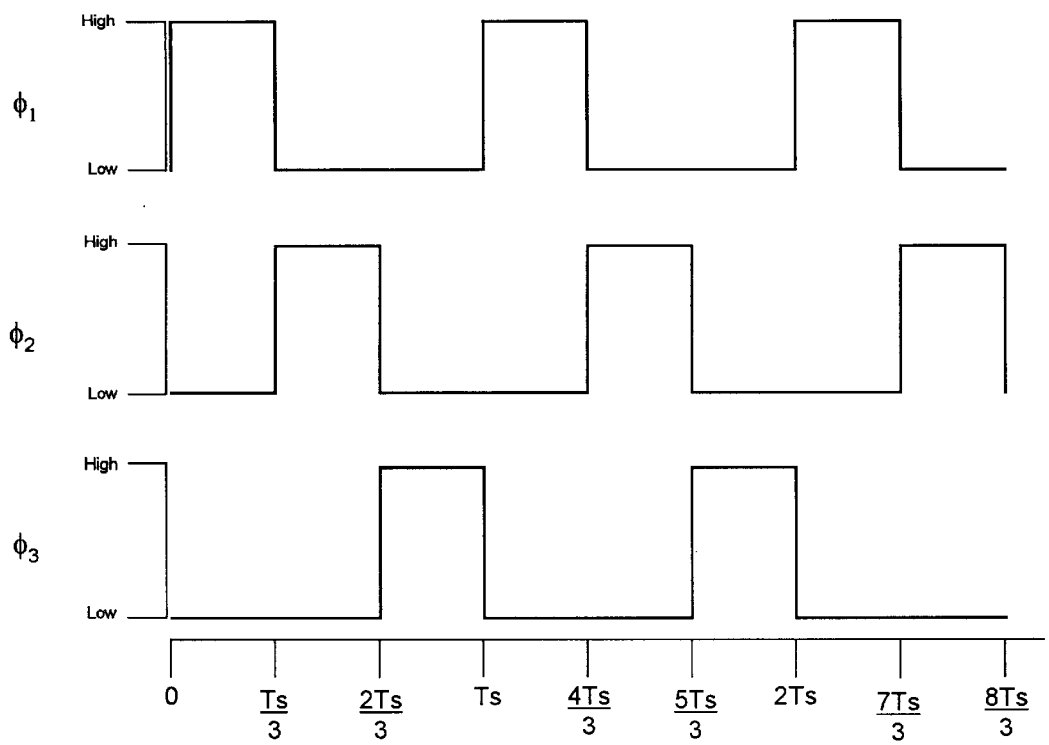
FIG. 4A is a diagram of a 3-phase clock that provides timing control signals for the circuit of FIG. 2.

Oscillators 36a, 36b and 36c generate a three-phase clock, $\phi_1$, $\phi_2$ and $\phi_3$, as shown in FIG. 4A. Clock signals $\phi_1$, $\phi_2$ and $\phi_3$ operate at a common switching frequency $f_s=1/T_s$, but are 360°/3=120° out of phase from each other. As a result, regulator stages 70a, 70b and 70c each operate 120° out of phase from one another. As shown in FIG. 4A, clock signals $\phi_1$, $\phi_2$ and $\phi_3$ are squarewaves pulses. Persons skilled in the art will recognize that clock signals $\phi_1$, $\phi_2$ and $\phi_3$ may be overlapping or non-overlapping waveforms. Oscillators 36a, 36b and 36c are known in the art, and will not be further described herein.

Because the inverting inputs of comparators 30a, 30b and 30c each receive the same control signal from output $V_e$ of error amplifier 28a, regulator stages 70a, 70b and 70c supply currents $I_{L1}$, $I_{L2}$, $I_{L3}$ that are substantially equal. Further, because currents $I_{L1}$, $I_{L2}$ and $I_{L3}$ are each only ⅓ the total output current $I_{OUT}$ supplied to load $R_L$, inductors 16a, 16b and 16c are smaller than that required for a single-stage design, and may be implemented using surface-mount technology. Additionally, because currents $I_{L1}$, $I_{L2}$ and $I_{L3}$ are out of phase with respect to one another, their ripple currents tend to cancel, thereby reducing the composite output ripple current. As a result, each stage may be designed for high slew rate capability by using a smaller inductor (and consequently higher per-stage output ripple current) than would normally be acceptable in a single-stage design.

Moreover, the input current pulses of regulator stages 70a, 70b and 70c are time-interleaved, which effectively increases the apparent switching frequency of regulator 70 to three times the switching frequency $f_s$ of each individual stage. Further, the apparent duty factor of regulator 70 is increased because the composite ON-time for switches 12a, 12b and 12c is longer than the ON-time of the main switch in a single-stage design. Because the peak current of each stage is reduced (e.g., typically $I_{OUT}/3$) and the input current pulses are time-interleaved, the input current peak-to-average ratio is reduced. As a result, the total RMS input ripple current is reduced compared to a single-stage design, and therefore the input filter capacitor requirements and conducted EMI are reduced.

Persons skilled in the art will recognize that the circuitry of the present invention may be implemented using circuit elements other than those shown and discussed above. For example, Hall-effect devices, current sense transformers, or other suitable current-sense device may be used instead of sense resistors 24a, 24b and 24c.

Figure 3:
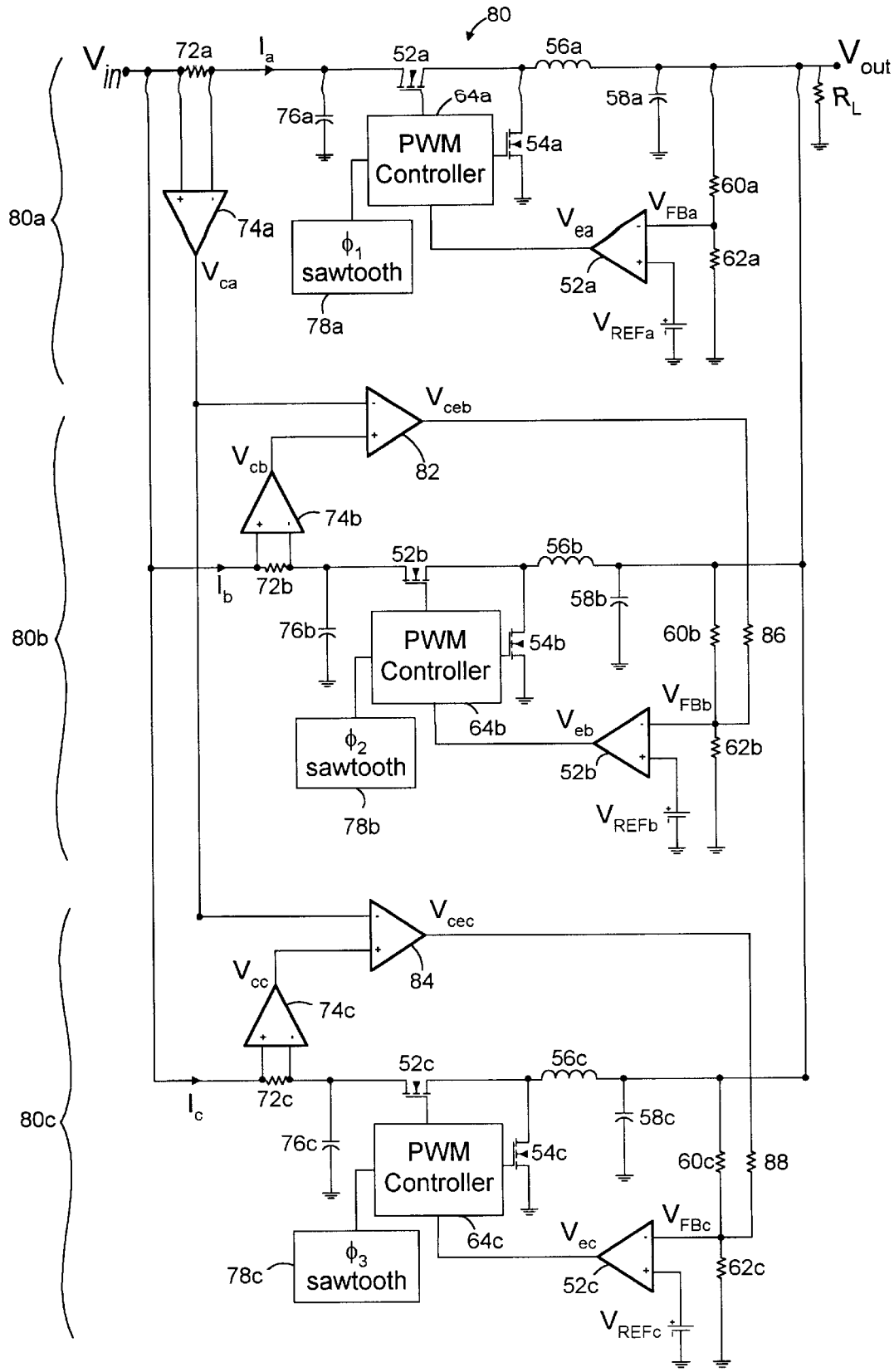
FIG. 3 is a schematic diagram of an exemplary embodiment of a 3-stage voltage-mode synchronous switching regulator constructed in accordance with the principles of the present invention.

FIG. 3 shows a schematic diagram of another exemplary embodiment of a polyphase synchronous switching regulator of the present invention. In particular, regulator 80 includes three separate voltage-mode switching regulator stages, 80a, 80b and 80c, each of which are derived from the single-phase regulator 50 of FIG. 1B. Regulator stages 80a, 80b and 80c are identical, except that stages 80b and 80c also include error amplifiers 82 and 84 that operate in accordance with the principles of the present invention to force the input current of regulator stages 80b and 80c to equal to the input current of regulator stage 80a.

Figure 4B:
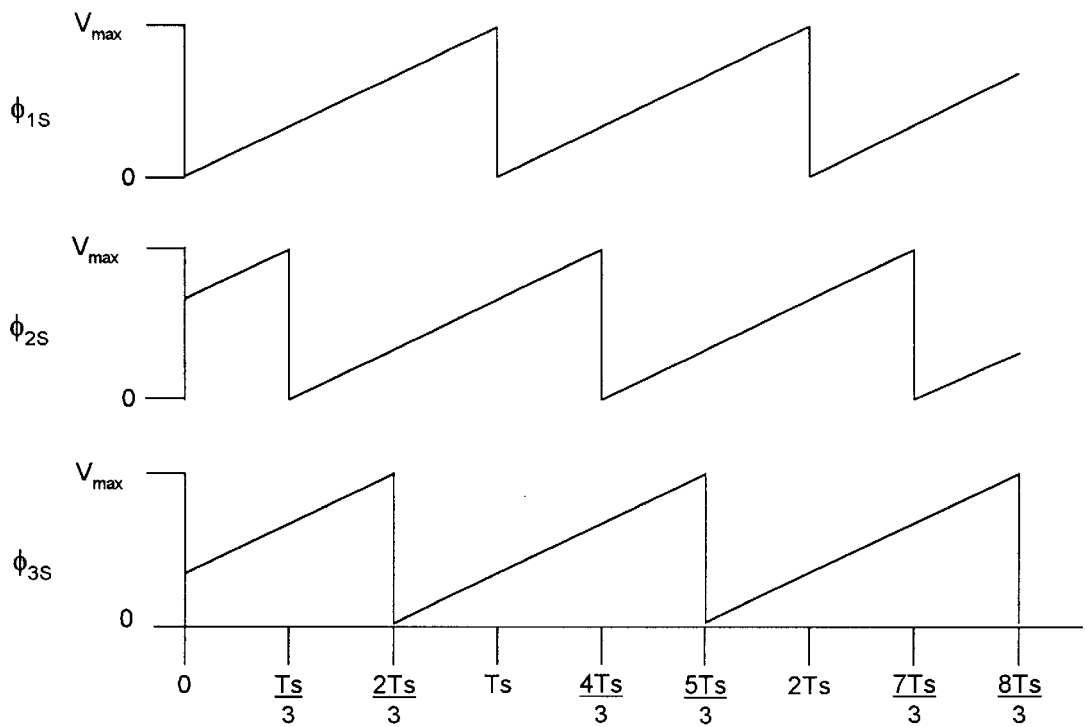
FIG. 4B is a diagram of a 3-phase sawtooth voltage waveform that provides timing control signals for the PWM controllers shown in FIG. 3.

Regulator stages 80a, 80b and 80c each include a core switching regulator that includes main switch 52a–c, synchronous switch 54a–c, inductor 56a–c, output capacitor 58a–c, voltage divider resistors 60a–c and 62a–c, voltage reference $V_{REFa-c}$, error amplifier 52a–c, PWM controller 64a–c and sawtooth generator 78a–c, respectively. Each core switching regulator functions as described above in connection with the single-phase regulator of FIG. 1B. Sawtooth generators 78a, 78b and 78c, constructed in accordance with previously known techniques, generate sawtooth waveforms Buss $\phi_{1S}$, $\phi_{2S}$ and $\phi_{3S}$ as shown in FIG. 4B that operate at a common frequency $f_s=1/T_s$, but are 360°/3= 120° out of phase from each other. As a result, regulator stages 80a, 80b and 80c operate 120° out of phase from adjacent stages.

Although ideally all three regulator stages 80a–80c are identical, in practice, small variations in component values (e.g., voltage divider resistors 60a–c and 62a–c, and voltage reference $V_{REFa-c}$) cause slightly different (e.g., on the order of several percent) output voltages from stage-to-stage. Unless corrected, such small errors would cause large current imbalances from stage-to-stage.

To prevent such large stage-to-stage current imbalances, regulator 80 includes additional circuitry that force the currents in each stage to be substantially equal. In particular, regulator stages 80a, 80b and 80c also include current sense resistors 72a–c, that are coupled between the input node $V_{IN}$ and main switches 52a–c, respectively. Capacitors 76a–c are coupled between ground and the node formed between resistors 72a–c, and main switches 52a–c, respectively. Resistors 72a–c, and capacitors 76a–c provide filtering to limit the input current ripple of each regulator stage. Regulator stages 80a, 80b and 80c also include current sense amplifiers 74a–c whose inputs are coupled across sense resistors 72a–c, and whose outputs $V_{ca}$–$V_{cc}$, are proportional to the input currents $I_a$–$I_c$ of regulator stages 80a, 80b and 80c, respectively.

Regulator stages 80b and 80c also include error amplifiers 82 and 84 that operate to force input currents $I_b$ and $I_c$ of regulator stages 80b and 80c to substantially equal input current $I_a$ of regulator stage 80a. That is, regulator stage 80a functions as a master, and regulator stages 80b and 80c function as slaves whose input currents are forced to substantially equal the input current of the master. In particular, output $V_{ca}$ of current sense amplifier 74a is coupled to the inverting input of error amplifiers 82 and 84. Output $V_{cb}$ of current sense amplifier 74b is coupled to the non-inverting input of error amplifier 82, and output $V_{cc}$ of current sense amplifier 74c is coupled to the non-inverting input of error amplifier 84. Resistor 86 is coupled between the output $V_{ceb}$ of error amplifier 82 and the inverting input of error amplifier 52b, and resistor 88 is coupled between the output $V_{cec}$ of error amplifier 84 and the inverting input of error amplifier 52c.

Error amplifier 82 provides output $V_{ceb}$ that is proportional to the difference between the input currents $I_a$ and $I_b$. Together with error amplifier 52b, error amplifier 82 tends to force $I_b$ to substantially equal $I_a$. In particular, if input current $I_b$ is less than input current $I_a$, $V_{cb}$ will be less than $V_{ca}$, which will cause output $V_{ceb}$ of error amplifier 82 to decrease from its steady-state value. As a result, output error voltage $V_{eb}$ of error amplifier 52b will increase, which will cause PWM controller 64b to increase the duty cycle of main switch 52b, and thereby increase input current $I_b$.

If however, input current $I_b$ is greater than input current $I_a$, $V_{cb}$ will be greater than $V_{ca}$, which will cause output $V_{ceb}$ of error amplifier 82 to increase from its steady-state value. As a result, output error voltage $V_{eb}$ of error amplifier 52b will decrease, which will cause PWM controller 64b to decrease the duty cycle of main switch 52b, and thereby decrease input current $I_b$. Error amplifier 84 operates in a similar manner to force input current $I_c$ to substantially equal input current $I_a$.

A person of ordinary skill in the art will understand that current sense resistors 72a–c, alternatively could be coupled between output node $V_{OUT}$ and inductors 56a–c , respectively, to sense output current, and that error amplifiers 82 and 84 could be configured to force the output currents of regulator stages 80b and 80c to substantially equal the output current of regulator stage 80a.

A person of ordinary skill in the art also will appreciate that the present invention is not limited to the embodiments described above that use three regulator stages that operate with three-phase clocks or sawtooth waveforms. Instead, the present invention more generally involves connecting N regulator stages, with each stage synchronized to a clock (for current-mode implementations) or sawtooth waveform (for voltage-mode embodiments) that is 360°/N out of phase from the adjacent stage. Each stage supplies current $I_L/N$ to the load, and the composite regulator operates at an apparent switching frequency of $Nf_s$, M where $f_s$ is the switching frequency of each individual stage.

Persons skilled in the art further will recognize that the circuitry of the present invention may be implemented using circuit configurations other than those shown and discussed above. For example, the present invention also may be implemented using well-known boost and forward converter circuit topologies. All such modifications are within the scope of the present invention, which is limited only by the claims which follow.

What is claimed is:

1. A polyphase synchronous switching regulator that generates an output signal at an output node, the output signal supplying a current I at a regulated voltage to a load, the regulator comprising:
    an input node to which an input signal is applied;
    timing circuitry that generates N-phase timing pulses;
    control circuitry coupled to the output node that controls a duty cycle of the regulator;
    N synchronous switching regulator stages coupled to the input node, the output node, the timing circuitry and the control circuitry, each of the N regulator stages providing current I/N to the output node in response to the N-phase timing pulses such that the N regulator stages operate 360°/N out of phase from one another.

2. The polyphase synchronous switching regulator of claim 1, wherein the control circuitry provides current-mode control.

3. The polyphase synchronous switching regulator of claim 1, wherein the control circuitry provides voltage-mode control.

4. The polyphase synchronous switching regulator of claim 1, wherein the control circuitry comprises feedback circuitry coupled to the output node, the feedback circuitry providing N feedback signals that control the duty cycle of the regulator, each feedback signal coupled to a corresponding one of the N synchronous switching regulator stages and having a predetermined relationship to the output signal and a reference voltage.

5. The polyphase synchronous switching regulator of claim 4, wherein each of the N feedback signals is proportional to a difference between a voltage proportional to a reference voltage and a voltage proportional to the output signal.

6. The polyphase synchronous switching regulator of claim 4, wherein each of the N feedback signals is proportional to a difference between a voltage proportional to a corresponding one of N reference voltages, and a voltage proportional to the output signal.

7. The polyphase synchronous switching regulator of claim 1, wherein the control circuitry comprises current sense circuitry that monitors current in each of the N synchronous switching regulator stages and provides N current sense signals that control the duty cycle of the regulator.

8. The polyphase synchronous switching regulator of claim 1, wherein the control circuitry comprises:
    current sense circuitry that monitors current in each of the N synchronous switching regulator stages and provides N current sense signals;
    feedback circuitry coupled to the output node and the current sense signals, the feedback circuitry providing N feedback signals that control the duty cycle of the regulator, each feedback signal coupled to a corresponding one of the N regulator stages and having a predetermined relationship to the output signal and a reference voltage.

9. The polyphase synchronous switching regulator of claim 8, wherein each of the N feedback signals has a predetermined relationship to the output signal and a corresponding one of N reference voltages.

10. The polyphase synchronous switching regulator of claim 8, wherein the N feedback signals further force the monitored currents in the N regulator stages to be substantially equal.

11. The polyphase synchronous switching regulator of claim 1, wherein the timing pulses comprise squarewave pulses.

12. The polyphase synchronous switching regulator of claim 1, wherein the timing pulses comprise sawtooth pulses.

13. A polyphase synchronous switching regulator that generates an output signal at an output node, the output signal supplying a current I at a regulated voltage to a load, the regulator comprising:

an input node to which an input signal is applied;

timing circuitry that generates N-phase timing pulses;

feedback circuitry coupled to the output node, the feedback circuitry providing N feedback signals that control a duty cycle of the regulator;

N synchronous switching regulator stages coupled to the input node, the output node, the timing circuitry and the feedback circuitry, each of the N synchronous switching regulator stages providing current I/N to the output node in response to the N-phase timing pulses such that the N regulator stages operate 360°/N out of phase from one another.

14. The polyphase synchronous switching regulator of claim 13, wherein the feedback circuitry further comprises an error amplifier.

15. The polyphase synchronous switching regulator of claim 14, wherein the error amplifier has an inverting input coupled to the output node, a non-inverting input coupled to a reference voltage, and an output that controls the duty cycle of the regulator.

16. The polyphase synchronous switching regulator of claim 15, wherein the feedback circuitry further comprises a resistor-divider network.

17. The polyphase synchronous switching regulator of claim 16, wherein:

the resistor-divider network comprises a first resistor coupled between the inverting input and GROUND and a second resistor coupled between the output node and the inverting input; and the voltage at the inverting input substantially equals the reference voltage when the output substantially equals the regulated voltage.

18. The polyphase synchronous switching regulator of claim 17, wherein each of the N regulator stages further comprises a comparator.

19. The polyphase synchronous switching regulator of claim 17, wherein the feedback circuitry further comprises:

current sense circuitry that monitors current in each of the N synchronous switching regulator stages and provides N current sense signals that are proportional to the monitored currents; and N comparators that each have a non-inverting input coupled to a corresponding one of the N current sense signals, an inverting input coupled to the output of the error amplifier, and an output that controls a duty cycle of a corresponding one of the N synchronous switching regulator stages.

20. The polyphase synchronous switching regulator of claim 19, wherein the current sense circuitry comprises a current sense resistor.

21. The polyphase synchronous switching regulator of claim 20, wherein the current sense circuitry further comprises a current sense amplifier.

22. The polyphase synchronous switching regulator of claim 21, wherein:

the current sense amplifier has an inverting input, a non-inverting input, and an output;

the current sense resistor is coupled between the inputs of the current sense amplifier; and the output of the current sense amplifier is coupled to the non-inverting input of the comparator.

23. The polyphase synchronous switching regulator of claim 13, wherein the feedback circuitry comprises N error amplifiers.

24. The polyphase synchronous switching regulator of claim 23, wherein each error amplifier has an inverting input coupled to the output node, a non-inverting input coupled to a corresponding one of N reference voltages, and an output coupled to a corresponding one of the N regulator stages to control the duty cycle of the regulator.

25. The polyphase synchronous switching regulator of claim 24, wherein the feedback circuitry further comprises N resistor-divider networks.

26. The polyphase synchronous switching regulator of claim 25, wherein:

each resistor-divider network is coupled to a corresponding one of the N error amplifiers and comprises a first resistor coupled between the inverting input of the error amplifier and GROUND and a second resistor coupled between the inverting input of the error amplifier and the output node, the voltage at the inverting input being substantially equal to the reference voltage that is coupled to the non-inverting input when the output substantially equals the regulated voltage.

27. The polyphase synchronous switching regulator of claim 13 wherein:

the feedback circuitry provides voltage-mode control; and each synchronous switching regulator stage further comprises current sense circuitry that monitors current in the regulator stage and provides current sense signals that are proportional to the monitored current.

28. The polyphase synchronous switching regulator of claim 27, wherein the current sense signal of each synchronous switching regulator stage is coupled to the feedback circuitry, the N feedback signals further causing the monitored current in each stage to be substantially equal.

29. The polyphase synchronous switching regulator of claim 27, wherein the current sense circuitry comprises a current sense amplifier.

30. A method for generating an output signal at an output node, the output supplying a current I at a regulated voltage to a load, the method comprising:

providing an input signal at an input node;

providing timing control circuitry that generates N-phase timing pulses;

providing control circuitry coupled to the output node that controls a duty cycle of the regulator; and providing N synchronous switching regulator stages coupled to the input node, the output node, the timing circuitry and the control circuitry, each of the regulator stages providing current I/N to the output node in response to the N-phase timing pulses such that the N regulator stages operate 360°/N out of phase from one another.

31. The method of claim 30, further comprising controlling the duty cycle of the regulator using current-mode control.

32. The method of claim 30, further comprising controlling the duty cycle of the regulator using voltage-mode control.

33. A method for generating an output signal an output node, the output signal supplying a current I at a regulated voltage to a load, the method comprising:

receiving an input signal at the input node;

generating N-phase timing pulses;

controlling a duty cycle of the regulator; and providing current I/N to the output node in response to the N-phase timing pulses from N synchronous switching regulator stages that operate 360°/N out of phase from one another.

* * * * *